US008548742B2

(12) United States Patent
Pugh et al.

(10) Patent No.: US 8,548,742 B2
(45) Date of Patent: Oct. 1, 2013

(54) NON-CONTACT MEASUREMENT SYSTEMS FOR WIRELINE AND COILED TUBING

(75) Inventors: Trevor K. C. Pugh, Tomball, TX (US);
Patrick A. Kelleher, Conroe, TX (US);
Kenneth R. Newman, Willis, TX (US)

(73) Assignee: National Oilwell Varco L.P., Houston, TX (US)

( * ) Notice: Subject to any disclaimer, the term of this patent is extended or adjusted under 35 U.S.C. 154(b) by 1380 days.

(21) Appl. No.: 12/288,719

(22) Filed: Oct. 21, 2008

(65) Prior Publication Data

US 2010/0097450 A1 Apr. 22, 2010

(51) Int. Cl.
| G06F 19/00 | (2011.01) |
| G06F 15/16 | (2006.01) |
| G01V 9/00 | (2006.01) |
| G01V 1/40 | (2006.01) |
| G01V 3/18 | (2006.01) |
| G01B 3/44 | (2006.01) |
| G01B 3/52 | (2006.01) |
| G01N 37/00 | (2006.01) |
| G01C 17/00 | (2006.01) |

(52) U.S. Cl.
USPC .................. 702/6; 702/34; 702/81; 702/150; 709/217

(58) Field of Classification Search
USPC ................ 348/61; 702/6, 33, 34, 81, 127, 702/150; 709/217
See application file for complete search history.

(56) References Cited

U.S. PATENT DOCUMENTS

| 3,513,912 A | 5/1970 | Boop |
| 3,788,575 A | 1/1974 | Boettcher et al. ........ 242/86.5 R |
| 4,139,306 A | 2/1979 | Norton .......................... 358/106 |
| 4,265,304 A | 5/1981 | Baugh .............................. 166/77 |
| 4,567,437 A | 1/1986 | Hubbard ....................... 324/237 |
| 4,940,095 A | 7/1990 | Newman ....................... 166/378 |
| 5,234,053 A | 8/1993 | Connell ........................ 166/250 |
| 5,279,366 A | 1/1994 | Scholes ......................... 166/254 |
| 5,426,968 A | 6/1995 | Mertens .................. 73/862.474 |
| 5,469,916 A | 11/1995 | Sas-Jaworsky et al. ........ 166/64 |
| 5,485,745 A | 1/1996 | Rademaker et al. ............ 73/151 |
| 5,560,437 A | 10/1996 | Dickel et al. .................... 175/40 |
| 5,626,192 A | 5/1997 | Connell et al. ............. 166/255.1 |
| 5,826,654 A | 10/1998 | Adnan et al. ............. 166/250.01 |

(Continued)

OTHER PUBLICATIONS

PCT/US2009/059972 International Search Report (Jan. 30, 2010).

(Continued)

*Primary Examiner* — Kristie Shingles
(74) *Attorney, Agent, or Firm* — Williams, Morgan & Amerson, P.C.

(57) ABSTRACT

A system for measuring at least one parameter of moving cable, the system including a system power source, a digital camera adjacent a moving cable for taking digital images of the cable as the cable moves past the digital camera, the digital camera producing signals corresponding to the digital images, a signal processor for receiving the signals from the digital camera and for processing the images to produce processed image data, the signal processor for calculating measurements of the at least one parameter of the cable based on the processed image data, the system power source for powering systems devices, e.g., the digital camera and/or the signal processor. This abstract is provided to comply with the rules requiring an abstract which will allow a searcher or other reader to quickly ascertain the subject matter of the technical disclosure and is submitted with the understanding that it will not be used to interpret or limit the scope or meaning of the claims, 37 C.F.R. 1.72(b).

40 Claims, 16 Drawing Sheets

(56) References Cited

U.S. PATENT DOCUMENTS

| | | | |
|---|---|---|---|
| 5,850,874 A | 12/1998 | Burge et al. | 166/77.3 |
| 5,975,203 A | 11/1999 | Payne et al. | 165/77.3 |
| 6,047,784 A | 4/2000 | Dorel | 175/61 |
| 6,257,332 B1 | 7/2001 | Vidrine et al. | 166/250.15 |
| 6,276,454 B1 | 8/2001 | Fontana et al. | 166/343 |
| 6,305,467 B1 | 10/2001 | Connell et al. | 166/66 |
| 6,321,596 B1 | 11/2001 | Newman | 73/152.45 |
| 6,472,660 B1 | 10/2002 | Hother | 250/269.1 |
| 6,527,056 B2 | 3/2003 | Newman | 166/384 |
| 6,536,539 B2 | 3/2003 | Merecka et al. | 175/62 |
| 6,563,303 B1 | 5/2003 | Watkins | 324/206 |
| 6,883,711 B2 | 4/2005 | Patton | 235/462.14 |
| 7,055,601 B2 | 6/2006 | Barrow | 166/255.1 |
| 7,073,582 B2 | 7/2006 | Connell et al. | 66/254.2 |
| 7,172,038 B2 | 2/2007 | Terry et al. | 175/45 |
| 7,261,167 B2 | 8/2007 | Goldman et al. | 175/39 |
| 7,431,097 B2 | 10/2008 | Weightmann | 166/384 |
| 7,698,094 B2 * | 4/2010 | Aratani et al. | 702/150 |
| 2003/0101156 A1 * | 5/2003 | Newman | 707/1 |
| 2003/0118230 A1 | 6/2003 | Song et al. | 382/152 |
| 2004/0142792 A1 | 7/2004 | Glas et al. | 477/70 |
| 2004/0227822 A1 * | 11/2004 | Cartlidge et al. | 348/207.99 |
| 2005/0103980 A1 | 5/2005 | Schultz et al. | 250/208.1 |
| 2005/0224233 A1 | 10/2005 | Johnson | 166/382 |
| 2008/0095402 A1 * | 4/2008 | Kochi et al. | 382/103 |
| 2008/0290302 A1 * | 11/2008 | James et al. | 250/522.1 |

OTHER PUBLICATIONS

The Benefits of Real-Time Coiled Tubing Diameter Measurements; Quigley et al; SPE 46040; pp. 171-180; 1998.

Bowen Coiled Tubing Systems; Bowen Tools, Inc.; 9 pp; 1995.

Get Downhole Coiled Tubing Data When You Need It. As It Happens; Schlumberger Dowell; 1 p.; 1993.

Coiled tubing. pressure equipment and wireline equipment; Varco LP; 15 pp.; 2002.

Reeled Systems Technology: Shell Int'l Exploration and Production B.V.; SIEP 96-5285; 28 pp.; Nov. 1996.

* cited by examiner

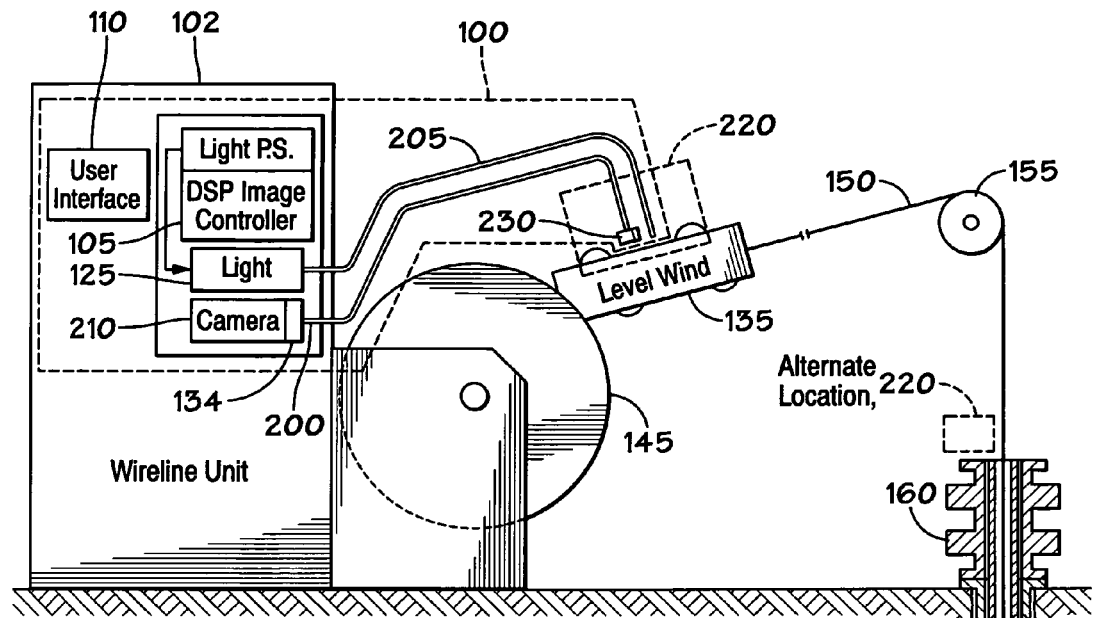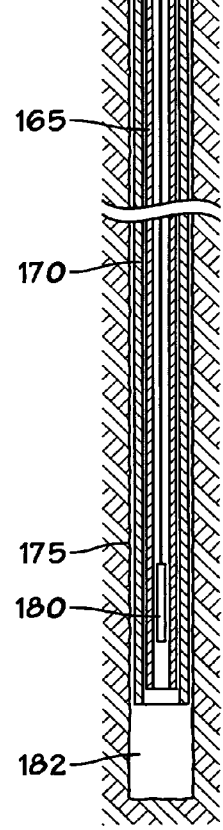
FIG. 2

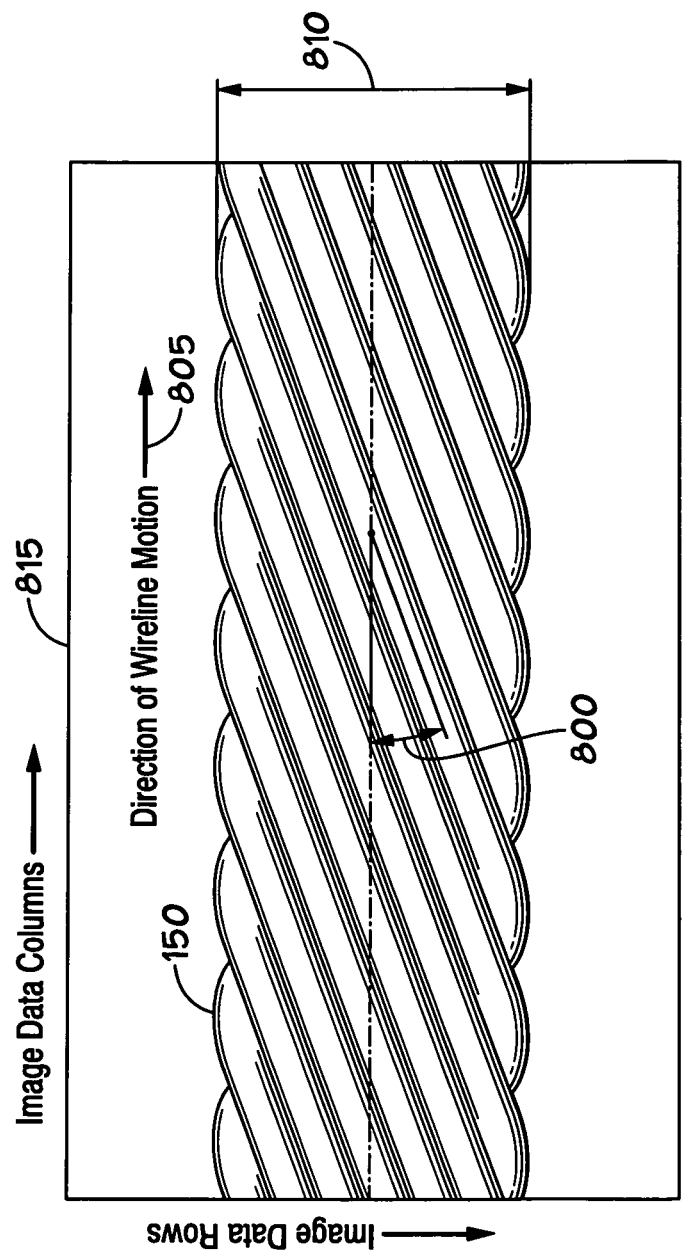

NON-CONTACT MEASUREMENT SYSTEMS FOR WIRELINE AND COILED TUBING

BACKGROUND OF THE INVENTION

1. Field of the Invention

The present invention is directed to systems and methods for measurements of wireline cable and coiled tubing as they are used in the oil or gas industry; and, in certain particular aspects, to non-contact measurement (e.g. of depth and velocity) of wireline cable and coiled tubing.

2. Description of Related Art

There are a variety of known methods used to measure the depth of equipment within oil and gas wells. In many instances these methods employ devices that are in physical contact with a conducting mechanism that transports the equipment through the wellbore, e.g. on a wireline cable ("wireline") or with coiled tubing. For example, often, when a wireline or coiled tubing operation is in progress, one known method of depth measurement relies on either one or two measurement wheels that are in contact with the wireline or coiled tubing that are in turn connected to quadrature encoders. The quadrature encoders produce a series of pulses as the measurement wheel(s) rotate in concert with the wireline cable or coiled tubing motion. At any particular measurement wheel the number of pulses is proportional to the length of wire or tubing that passed the measurement wheel. Several of such known depth measurement systems suffer accuracy and repeatability problems that manifest themselves as an inability to correctly record the depth of a leading end of a wireline cable or coiled tubing in the wellbore. Repeatability problems are often caused by an undetermined amount of slip which results when cable or tubing passes measurement wheels without an equivalent rotation of the measurement wheels being recorded.

Repeatability errors often are due to the inability of existing depth measurement systems to measure the amount of stretch in a cable or tubing. Stretch is caused by the weight of the equipment attached to the cable or tubing and the weight of the deployed cable or tubing. The stretch length can also depend on other factors such as friction and wellbore deviations.

In many known systems, accuracy is dependent on the diameter of the measurement wheels being known to a specified tolerance. Measurement wheels are prone to collecting dirt and grease that result in a change in an effective diameter. Although the diameter change is small, e.g. over a long 10,000 foot length of cable or tubing, the cumulative error in measurement can be significant and undetected. Over a prolonged period, wear of the measurement wheels is also factor.

An exemplary known wireline unit is a commercially available Wireline unit L▲6901001933 manufactured by Elmar, a National Oilwell Varco company located in Houston, Tex. (and co-owned with the present invention).

Existing exemplary coiled tubing units are the known coiled tubing units MKT10T or MK20T manufactured by Hydra Rig, a National Oilwell Varco company located in Dallas, Tex. (and co-owned with the present invention).

BRIEF SUMMARY OF THE INVENTION

The present invention is directed to systems and methods for determining measured parameters, e.g. the displacement, velocity and acceleration, of wireline cable or coiled tubing. In certain aspects, such systems and methods disclose depth, velocity and acceleration measurement on any wireline cable or coiled tubing (often wireline and coiled tubing are referred to collectively herein as "cable") that is in motion along its axis. In certain aspects, the present invention provides a system for measuring at least one parameter of moving cable, the system including: a digital camera for taking digital images of the cable as the cable moves, the digital camera adjacent moving cable or spaced-apart from or remote therefrom, the digital camera producing signals corresponding to the digital images, a signal processor for receiving the signals from the digital camera and for processing the images to produce processed image data, the signal processor for calculating measurements of the at least one parameter of the cable based on the processed image data. The present invention also discloses methods using such a system.

In certain particular aspects, such systems and methods are useful in the determination of moving block position, velocity and acceleration in crane operations.

In certain aspects, the present invention discloses apparatus and method with sensor(s) that do not touch a wireline cable or coiled tubing being measured. In certain particular aspects, a relatively small size system is used that allows for advantageous positioning of the equipment. Also, the present invention discloses methods for detecting cable condition and for real time inspection.

The present invention, in certain aspects, discloses systems and methods with the advantage of remote non-contact measurement of the motion of wireline or coiled tubing as it is used in oil and gas well operations, improving accuracy and long term reliability.

In oil or gas well operations, a wireline or coiled tubing is present on a drum which is rotated to pay out the wire or tubing through a level wind then over a plurality of sheaves, used to change the direction of the cable or tubing motion to the vertical plane, ready for insertion into a wellbore tubing that runs co-incident with, and is contained within the wellbore. In one aspect, a non-contact measurement system according to the present invention is mounted at a level wind or near the point of insertion of the wireline or coiled tubing, into a wellbore and/or into already-in-place tubing.

In certain particular aspects, a non-contact measurement system according to the present invention includes: a digital signal processor image controller for processing images and calculating measurements; a digital camera optically coupled to a lens assembly, for collecting digital images; digital camera electronics conductively coupled to the digital signal processor image controller through a high speed data link for transferring digital image data; a light source for illuminating the image area; a cleaning mechanism for keeping the image system components free from obstructions; and a user interface unit conductively coupled to the digital signal processing image controller for display of the calculated data and user input.

In an oil or gas well a non-contact measurement system is disclosed according to the present invention which is placed at a level wind, and a method is disclosed for accurately measuring wireline displacement (or coiled tubing) which includes the steps of: acquiring an image of the cable at a known time t=t0 and storing the image in local memory within a digital signal processor controller; acquiring a second image at a known time t=t0+Delta t and storing the image in local memory within a digital signal processor controller; processing the two images to produce a combined data set that can be analyzed to find a unique result that is proportional to the cable displacement between a first and a second image.

In one particular feature of the present invention, a step of processing image data uses the method of Hough Transforms.

Another feature of the invention is the use of an apparatus or device, e.g. a fan, a blower, or an air knife, to insure that the image and light paths are kept clean and free of moisture and debris that are typical in oil and gas field operating environments. Surprisingly, an unexpected added advantage of using such a fan, etc. is the dissipation of heat, e.g. heat generated by a digital camera and/or lighting source. This dissipation of heat is advantageous for insuring that heat-sensitive system components are maintained within a desired operational temperature range.

Another feature of certain systems and methods according to the present invention are methods for detecting reduced image fidelity as a result of stationary dirt and debris in the image plane.

Certain methods according to the present invention disclose the real time inspection of a wireline or of a coiled tubing.

In one particular embodiment of a system according to the present invention a high frame rate digital camera and lens assembly is optically coupled to a fiber cable bundle and a light source is optically coupled to another fiber cable bundle. The lower number of pixels in a typical fiber bundle is matched to the number of digital camera pixels by selecting a small sub area of pixels on the digital camera's image sensor. The frame rate of the digital camera is increased to a rate that insures images are collected rapidly enough so that an object does not traverse the image plane before a second image can be acquired. The second embodiment allows the digital camera and light source to be mounted away from a sensor head. The sensor head can be mounted at either the level wind or near the wellhead insertion point and includes the fiber bundles, cleaning system, and reference and supporting structures.

In another particular embodiment of a system according to the present invention a digital camera and lens assembly is optically coupled to a plurality of fiber cable bundles and a light source is optically coupled to a single fiber cable bundle. This embodiment allows the digital camera to operate at a lower frame rate as the total number of pixels in the combined fiber bundles is close to the number of pixels in the image sensor of the digital camera. This embodiment also allows the digital camera and light source to be mounted away from a sensor head. The sensor head can be mounted at either the level wind or near the wellhead insertion point. In this embodiment the sensor head includes the fiber bundles, cleaning system, reference and supporting structures.

In certain embodiments of systems and methods according to the present invention, one aspect is the determination of the distance moved by the object in the image incident on the digital camera image sensor, from one image frame to the next image frame. Determination of the distance moved by the object in the image occurs often enough to insure that the object in the image does not move beyond the image frame boundaries. In such embodiments instantaneous velocity and displacement data are obtainable.

In certain embodiments according to the present invention, a digital signal processor image controller is replaced by a sufficiently powerful commercial computer, although due to timing constraints (wobble), velocity is calculated over a larger number of displacement readings.

The present invention in certain embodiments is implemented with one (or more) of three distinct algorithms to calculate the distance moved by the wireline between images acquired consecutively. Certain embodiments of the present invention are implemented using a cross-correlation of statistical factors algorithm or a two dimensional cross-correlation algorithm. Certain embodiments can also be implemented using a known Fast Fourier Transform producing phase domain data and a known Hough Transform algorithm.

Accordingly, the present invention includes features and advantages which are believed to enable it to advance moving wireline and tubing measurement technology. Characteristics and advantages of the present invention described above and additional features and benefits will be readily apparent to those skilled in the art upon consideration of the following detailed description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide new, useful, unique, efficient, nonobvious systems and methods for the non-contact measurement of cable (wireline and coiled tubing) for wellbore operations.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, other purposes and advantages will be appreciated from the following description of certain preferred embodiments, given for the purpose of disclosure, when taken in conjunction with the accompanying drawings. The detail in these descriptions is not intended to thwart this patent's object to claim this invention no matter how others may later attempt to disguise it by variations in form, changes, or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

Certain aspects, certain embodiments, and certain preferable features of the invention are set out herein. Any combination of aspects or features shown in any aspect or embodiment can be used except where such aspects or features are mutually exclusive.

BRIEF DESCRIPTION OF THE SEVERAL VIEWS OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 2 is a schematic diagram of a non-contact measurement system according to the present invention, with an electronics package located in a wireline unit and optically coupled through two fiber bundles, to a sensor head, located at a level wind.

FIG. 8 is an image of a wireline cable produced by a system according to the present invention.

Figure 1A:
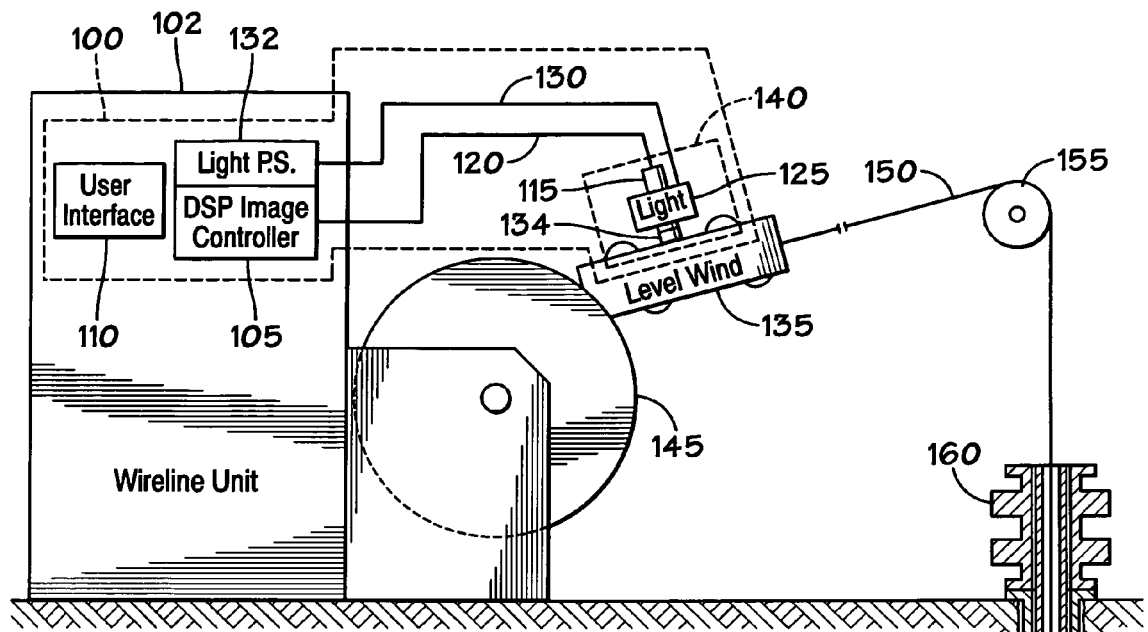
FIG. 1A is a schematic diagram of a non-contact measurement system according to the present invention, located in a level wind apparatus attached to a wireline unit in the process of inserting wireline into a wellbore.

Presently preferred embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

Figure 3:
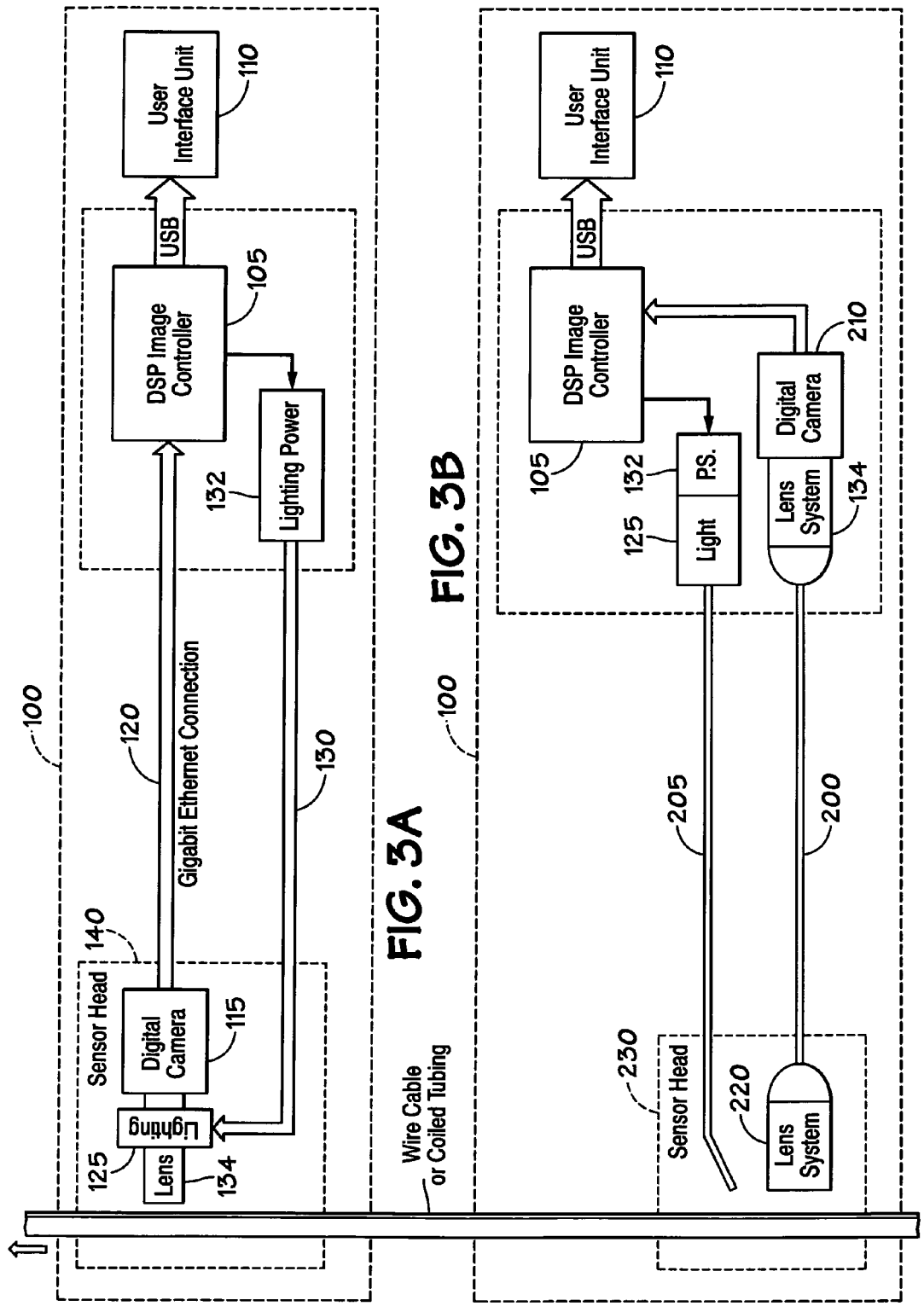
FIG. 3A is a functional block diagram of a system according to the present invention.
FIG. 3B is a functional block diagram of a system according to the present invention.

As shown in FIG. 1A, a non-contact measurement system 100 according to the present invention, includes a digital signal processor image controller 105, a user interface 110, a digital camera 115 with an optically coupled lens system 134 and a power cable and category six ethernet cable 120, and a light source 125 with a power cable 130 and a power source 132 (see FIG. 3A). The digital camera 115, lens system 134, and the light source 125 are mounted at a level wind 135 in a sensor head 140. The level wind 135 is mounted to a wireline drum 145 and a wireline cable 150 passes from the wireline drum 145 through the level wind 135 and past the digital camera 115 and light source 125. The wireline cable 150 passes over a sheave 155 and is inserted into the wellbore tubing 165, through a blowout preventer 160. The lens system 134 is adjacent the path of wireline cable or coiled tubing and is optically coupled to the digital camera 115. The wellbore tubing 165 is inside and coincident with well casing 170 that is in turn, inside and coincident with a wellbore 175. The wireline cable 150 transports a load 180 into wellbore tubing 165. The wireline cable 150 may also transport the load into open hole 182.

Figure 1B:
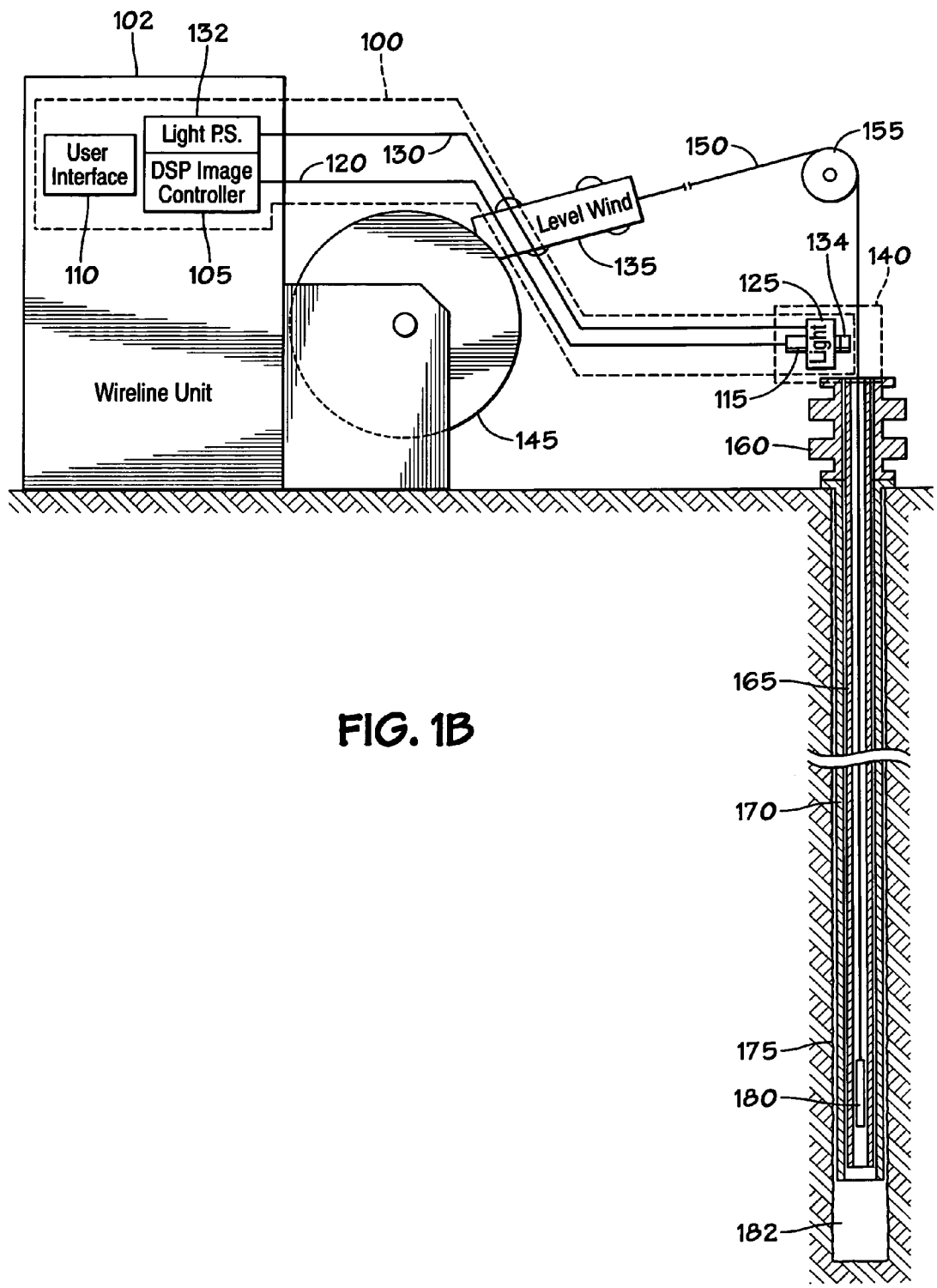
FIG. 1B is a schematic diagram of a non-contact measurement system according to the present invention, located above a point of cable insertion in a wellbore.
Figure 1C:
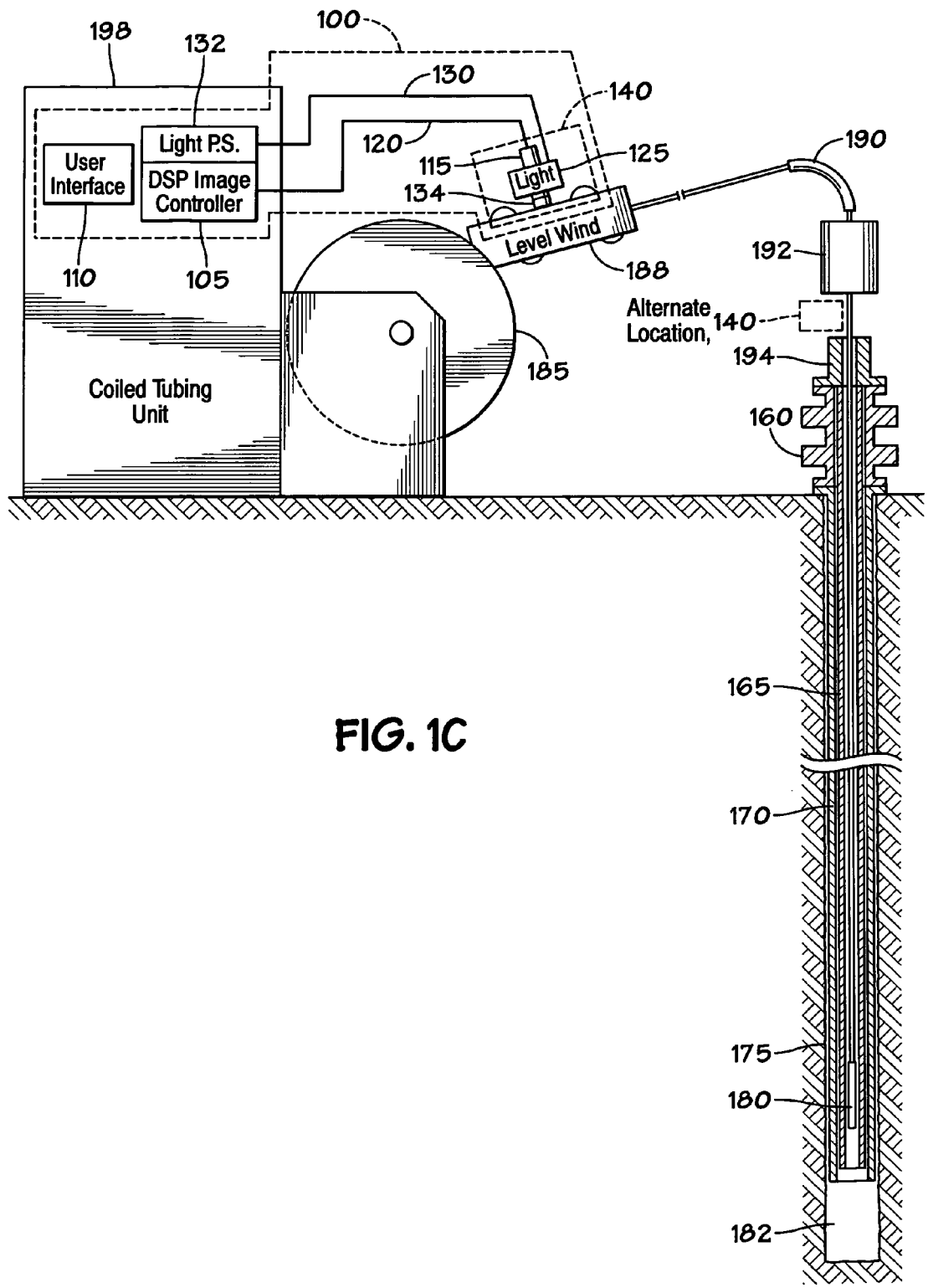
FIG. 1C is a schematic diagram of a non-contact measurement system according to the present invention, with an electronics package being located in a coiled tubing unit.

FIG. 1B shows an alternate placement of the non-contact measurement system 100, with the digital camera 115, lens system 134, and light source 125 in the sensor head 140, mounted above the blowout preventer 160. FIG. 1C shows the non-contact measurement system 100 in a coiled tubing operation. In coiled tubing operations, tubing is fed off a tubing drum 185 and passes through a coiled tubing level wind 188 and, as a consequence, past the sensor head 140. The tubing exits the level wind 188 and passes over a guide arch 190 and into an injector 192. The injector 192 provides the force required to drive the coiled tubing into a stripper 194 and through the blowout preventer 160, and subsequently into the wellbore tubing 165. The stripper 194 provides a pressure seal between wellbore pressures and ambient air pressure. An alternate placement for the sensor head 140 in coiled tubing operations is between the injector 192 and the stripper 194.

FIG. 2 shows an embodiment of the system 100 that includes a digital signal processor image controller 105, a user interface 110, a digital camera 210 with a lens system 134, an optically coupled fiber bundle 200, and a light source 125 with an optically coupled fiber bundle 205. A second lens system 230 is adjacent a path of wireline or coiled tubing and optically coupled to the fiber bundle 205. The optical fiber bundles 200 and 205, and the lens system 230, are mounted in a sensor head 220 at the level wind 135. In this embodiment the digital camera 210 and light source 125 are mounted away from the level wind 135. One known digital camera is a piA640-210 gm from Basler Company, in Exton, Pa. and one known light source 125 is a Model 1157-W30 from Super Bright LED company, in St Louis, Mo. Another known the digital camera is an AOS X-VIT high speed camera from AOS Baden▲Daettwil, Switzerland. Optical fiber bundles include Model number F14-2BDP-1350-20K from MEDIT, Inc. in Winnipeg, Canada. The fiber bundles 200, 205 may be in one integrated cable.

FIG. 3A illustrates a system 100, schematically, e.g. systems as shown in FIGS. 1A-1C.

FIG. 3B illustrates a system 100, schematically, as shown in FIG. 2.

Figure 4:
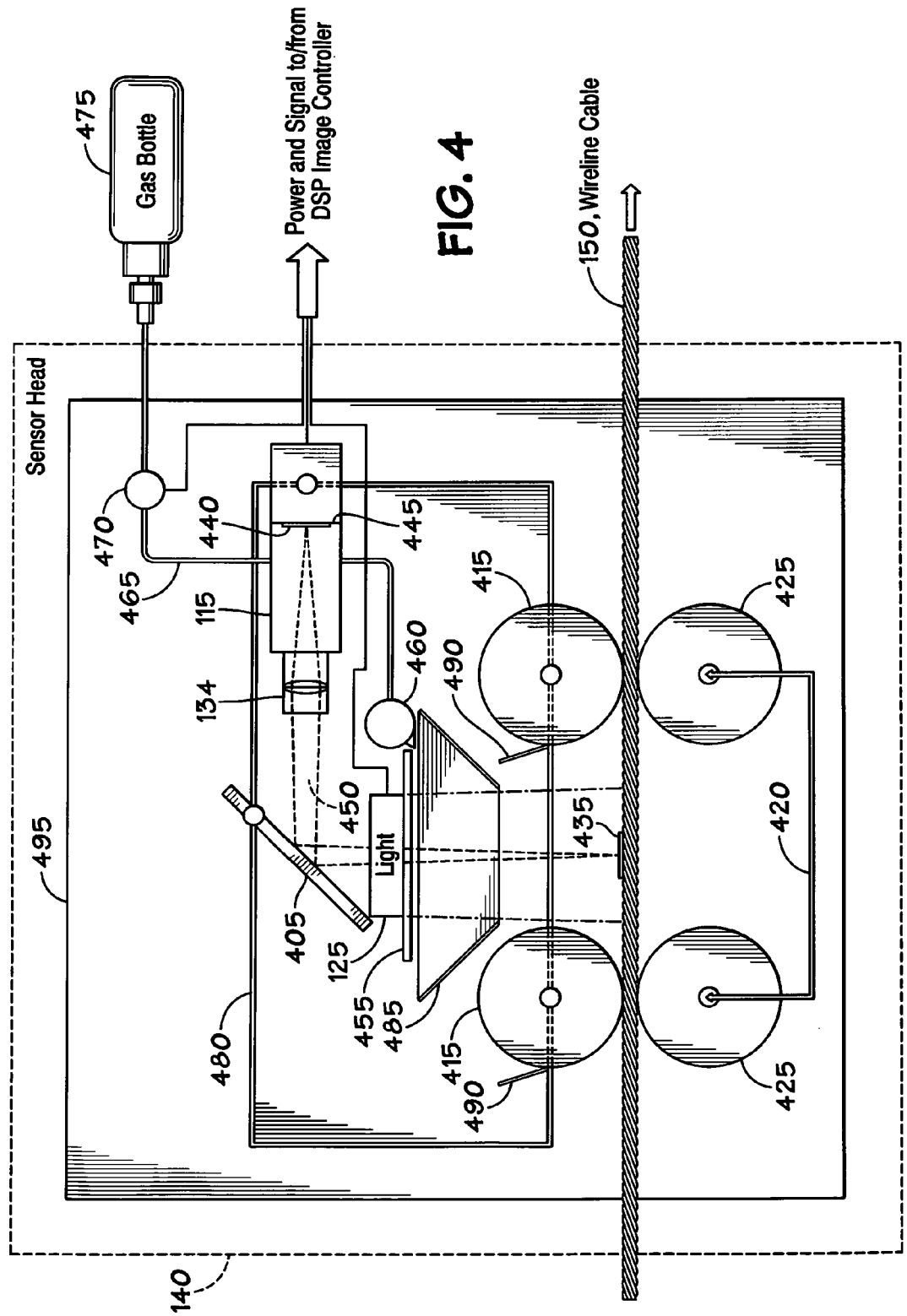
FIG. 4 is a schematic diagram of a non-contact measurement system sensor head according to the present invention.

Referring now to FIG. 4, a sensor head 140 in one aspect of the present invention includes a digital camera 115 with an image sensor 440 in an image plane 445; an optically coupled lens system 134; a reflective mirror 405; a light source 125; an air knife 460; a debris shield 485; an optically matched transparent shield 455 in an image path 450; a plurality of guide wheels 415; a pinch roller mechanism 420 for applying a force to a plurality of pinch rollers 425 on the wireline cable 150 and allowing for the unimpeded motion of the wireline cable 150 through an object plane 435. The pinch roller mechanism 420 is designed to inhibit side-to-side and up-and-down cable movement and restricts wireline cable motion in a direction other than the longitudinal axis of the wireline through the object plane 435.

The non-contact measurement system 100 is tolerant of off-axis motions of the wireline cable 150. The reflecting mirror 405 is at a desired angle, e.g. a 45 degree angle to the image plane 445. The position of the light source 125 relative to the object plane 435 and image path 450 is chosen to insure consistent lighting conditions for the digital camera 115. The image path 450 and light source 125 are kept clear of debris and moisture by using the air knife 460 in conjunction with the debris shield 485 and wheel scrapers 490.

The air knife 460 is connected to high pressure tubing 465, an electrically operated valve 470 and a gas bottle 475 which contains, e.g., nitrogen or air. Optionally, the air knife 460 and the transparent shield 455 use an electric roll-off machine with a clear film that is contained in a canister and paid out across the top of the debris shield 485 and parallel to the object plane 435. The film is periodically moved in an orthogonal direction to the direction of motion of the wireline cable 150 so that any dirt or debris that has collected on the film is removed from the view of the image sensor 440. In addition, there is no affect on the measurement system as it is insensitive to motion in the orthogonal direction of the wireline cable 150.

The digital camera 115, the reflective mirror 405, the guide wheels 415 and the image plane 445 are co-located and all connected to the reference frame 480. The reference frame insures that the object plane 435 and the image incident at the image plane 445 and the image sensor 440 in the digital camera 115, are at a known distance from each other and are co-planar to each other. The reference frame 480 is rigidly mounted to a chassis 495 of the sensor head 140. The gas bottle 475 is mounted separate from the sensor head 140.

In one aspect, the effect of lens system magnification is, optionally, taken in to account by placing a silicon etched test specimen in the object plane 435 and measuring the effective size of the image on the image plane 445 at the digital camera's 130 image sensor 440 and calculating a magnification factor. In this manner, a line between two points in the object plane 435 can be equated to the number of pixels covered by the line in the image plane 445 times the distance between adjacent pixels in the image sensor 440 times a magnification factor.

Figure 5:
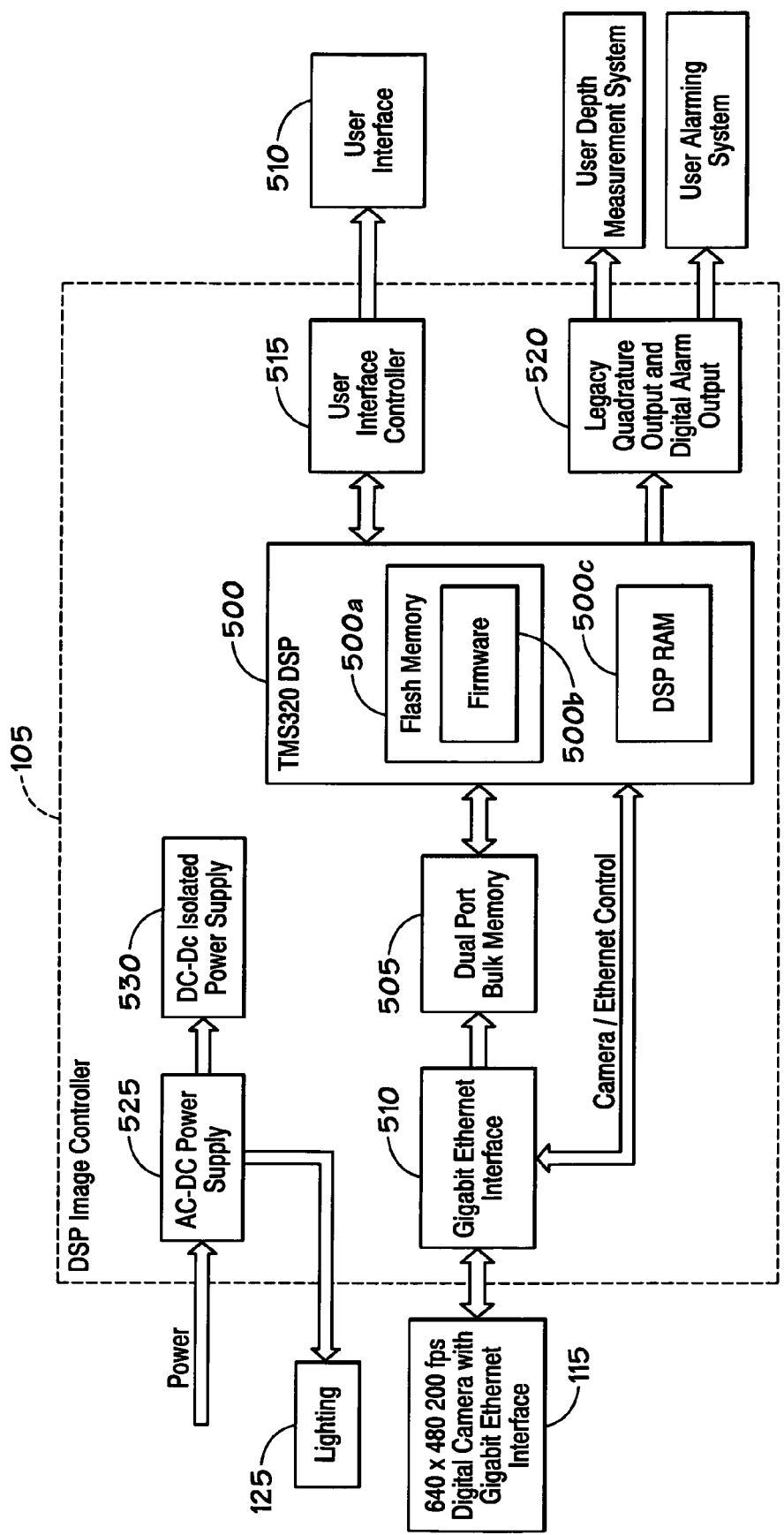
FIG. 5 is a functional block diagram of a digital signal processor image controller according to the present invention.

Referring now to FIG. 5, the digital signal processor image controller 105, in one embodiment, includes a digital signal processor 500 containing a flash memory 500$a$ and a digital signal processor RAM 500$b$, a dual port bulk memory system 505, a gigabit ethernet interface 510, a user interface controller 515, a digital output section 520, a AC-DC power supply 525 and a DCADC power supply 530. One known digital signal processor is a model No. TMS320 manufactured by Texas Instruments, in Austin, Tex. In certain aspects, any known digital signal processor that exceeds 500 million multiply and accumulate operations per second execution speed is used. In one aspect the digital camera 115 is a digital camera that contains a 640×400 pixel charge coupled device able to record in excess of 200 frames per second (e.g. the Basler Company camera mentioned above).

The flash memory 500$a$ contains programmed instructions, which are collectively known as firmware 500$b$. The digital signal processor image controller 105 and its firmware 500$b$ cause the digital camera 115 to collect image data and transfer the data through the gigabit ethernet interface 510 to the dual port bulk memory 505. A user can interact with the firmware 500$b$ can interact with a user through the user interface controller 515 and the user interface 110. The firmware 500$b$ can also cause signals to be activated through the digital interface 520 in order to inform the user of error events. The digital interface 520 is also used to create signals that simulate a quadrature encoder to allow for connection to legacy (known) systems.

In an alternate embodiment the digital signal processor image controller 105 and the user interface 110 are replaced by a laptop or similar computer of sufficient computational power.

Figure 6A:
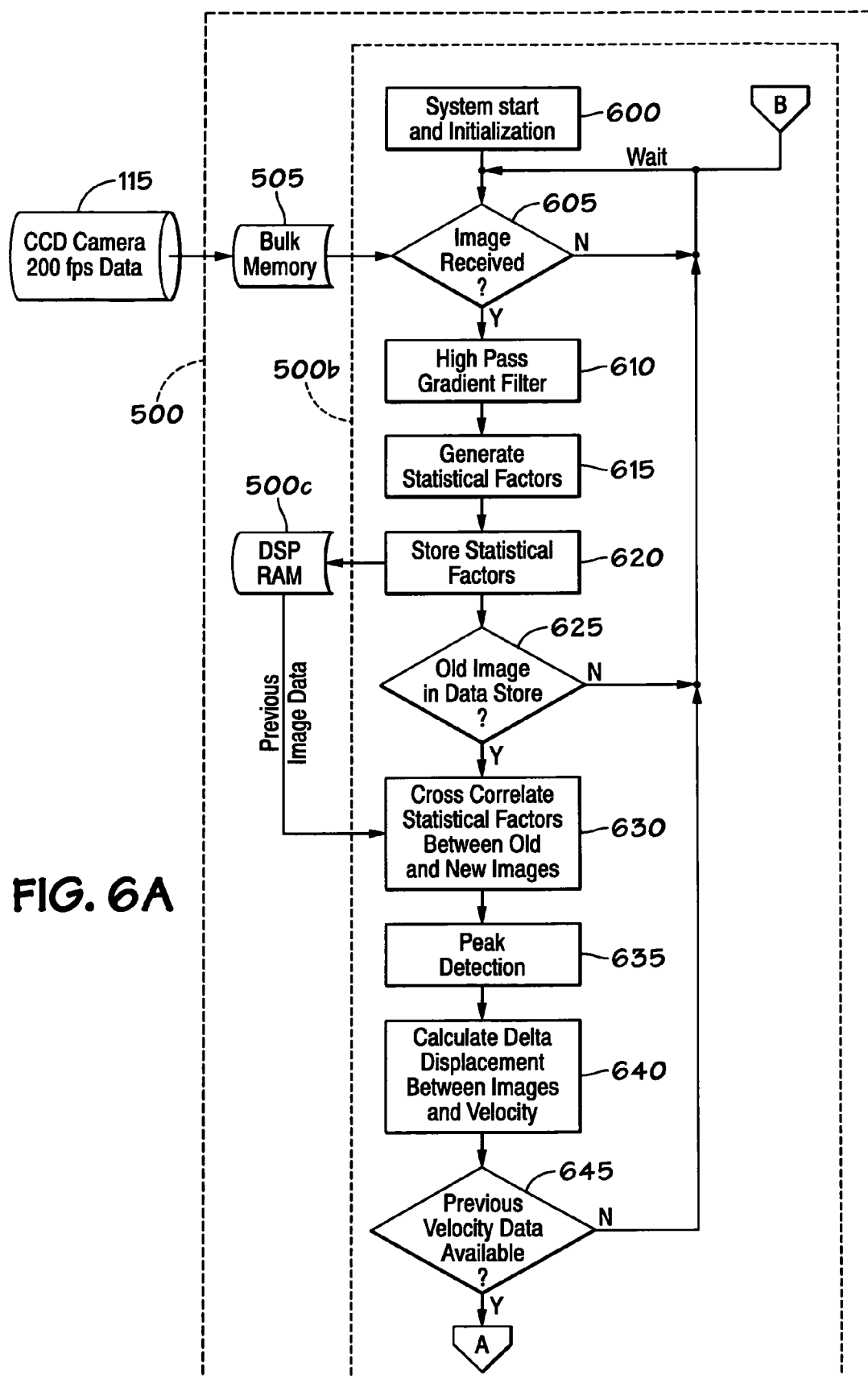
FIG. 6A presents a flow diagram illustrating operation of cross-correlation of statistical factors method according to the present invention for calculating displacement within firmware of a digital signal processor for systems according to the present invention.
Figure 6B:
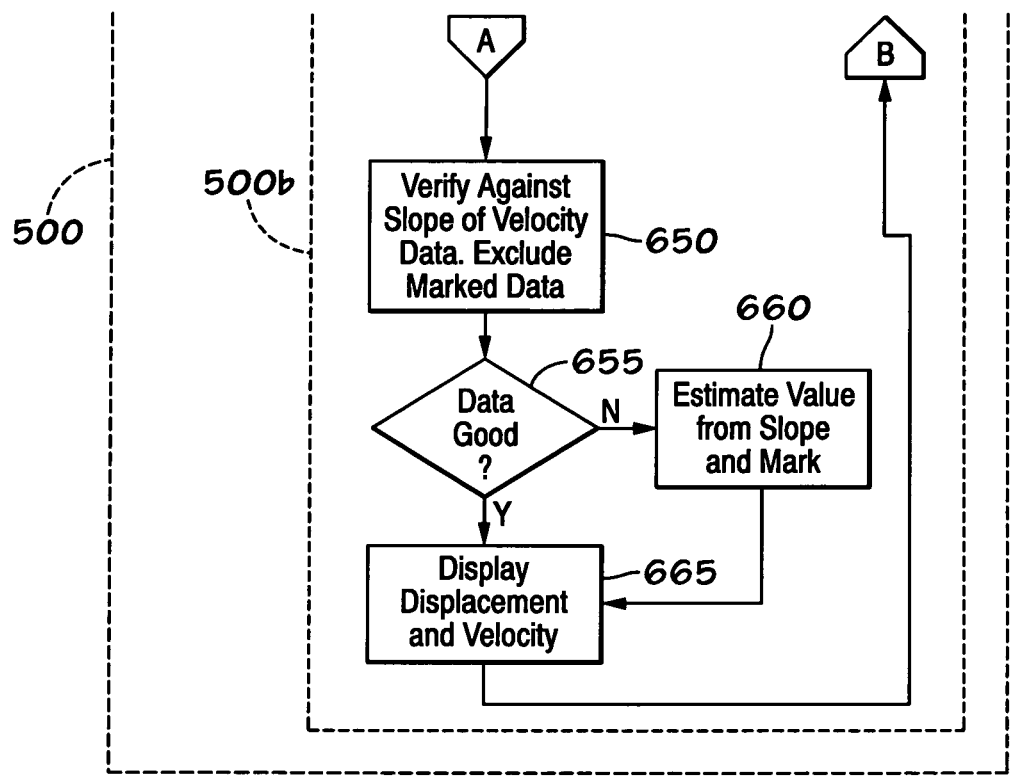
FIG. 6B presents a continuation of the flow diagram of FIG. 6A.

Referring now to FIGS. 6A and 6B, an algorithm implementation of the firmware 500$b$ is a cross-correlation of statistical factors. Firmware implements a method for collecting image data from the digital camera 115 and storing it in the dual port bulk memory 505 that continues at a set rate, independent of the remainder of other actions within the firmware 500$b$.

At the system start and initialization step 600, the system initializes the digital camera 115 with the appropriate synthetic aperture and exposure settings along with other initialization steps (e.g., initializing calibration factors, checking bulk memory 505 and DSP RAM 500$c$) required to start the system. An image is acquired by the digital camera 115 and is passed into the bulk memory 505 in the form of an image matrix. Once an image has been acquired and received, step 605, the system moves to a high pass filter step 610. The filter implemented is a chosen spatial filter (e.g. see spatial filters as described in the known National Instruments Vision Concepts Manual). In one aspect the spatial filter is a gradient filter with a kernel matrix arranged to emphasize image artifacts in the direction of motion of a wireline cable. The size or dimension of the kernel matrix can be used to trade off accuracy of result with speed of calculation. The kernel definition for a gradient filter is given below:

| a | −b | c |
| b | x | −d |
| c | d | −a |

This kernel can have the required axis of symmetry if the values are given as below:

| 0 | 1 | 1 |
| −1 | 0 | 1 |
| −1 | −1 | 0 |

This filter is sensitive to the variations of intensity perpendicular to the axis of symmetry.

The output of the high pass filter step 610, FIG. 6A, is passed to step 615 to generate statistical factors. In step 615 the statistical average, variance and kurtosis are generated from data in the image matrix that are orthogonal (columns) to the direction of motion of the wireline cable. In this manner the data are reduced to a single dimension array of data that emphasizes high contrast elements within the image matrix. Also, in this way a data array is generated that has distinctive structure but with much reduced data size and is thus a speed enhancement for the algorithm. Kurtosis is a known statistical method used to indicate data that contains peaks that are infrequent and with extreme deviations. The resultant data array is stored, step 620, in the digital signal processor RAM 500*c*.

The program instructions then test for previous image kurtosis data. If there is no previous data then the algorithm reverts to step 605. However, if previous kurtosis data is found in digital signal processor RAM 500*c*, then the program retrieves the data and performs step 630. Step 630 performs a cross-correlation (or sometimes known as "cross-covariance") on the two kurtosis data arrays.

Referring now to FIGS. 6A and 6B, step 635, peak detection, uses a smoothed second derivative peak detection algorithm. The algorithm results in the detection and identification of the location of the maximized peak created in the previous step 630. The peak detection algorithm, in certain aspects, produces a result that has sub-pixel resolution and accuracy better than 0.0003%. The sub-pixel resolution is achieved because the algorithm produces fitted data about the maximized peak.

The resultant maximized peak location found in step 635 is proportional to the displacement of the wireline cable that occurred between the two time separated images collected in steps 605 through 630. In step 645 the program checks for previous velocity data before it attempts to qualify the current displacement value. If there is previous velocity data, the program moves to step 650 and calculates the new velocity and compares it to the previous velocity data points. A limit is set that is equal to the maximum rate of change in velocity that can be expected from wireline system. In step 655 the data is tested and if the new displacement data results in a velocity calculation that exceeds a maximum rate of change of velocity in step 660, the data is excluded and an estimated velocity is calculated, and then integrated to produce the expected displacement value, that, in turn is added to the depth data in step 665. If the data is within specifications then the new displacement is added to the depth calculation and the velocity is updated in step 665. Acceleration data is available as the 2nd derivative of the distance data with respect to time.

The program returns to step 605 and continues.

An advantage of this algorithm is its speed of execution due to reduced data set sizes.

Figure 7A:
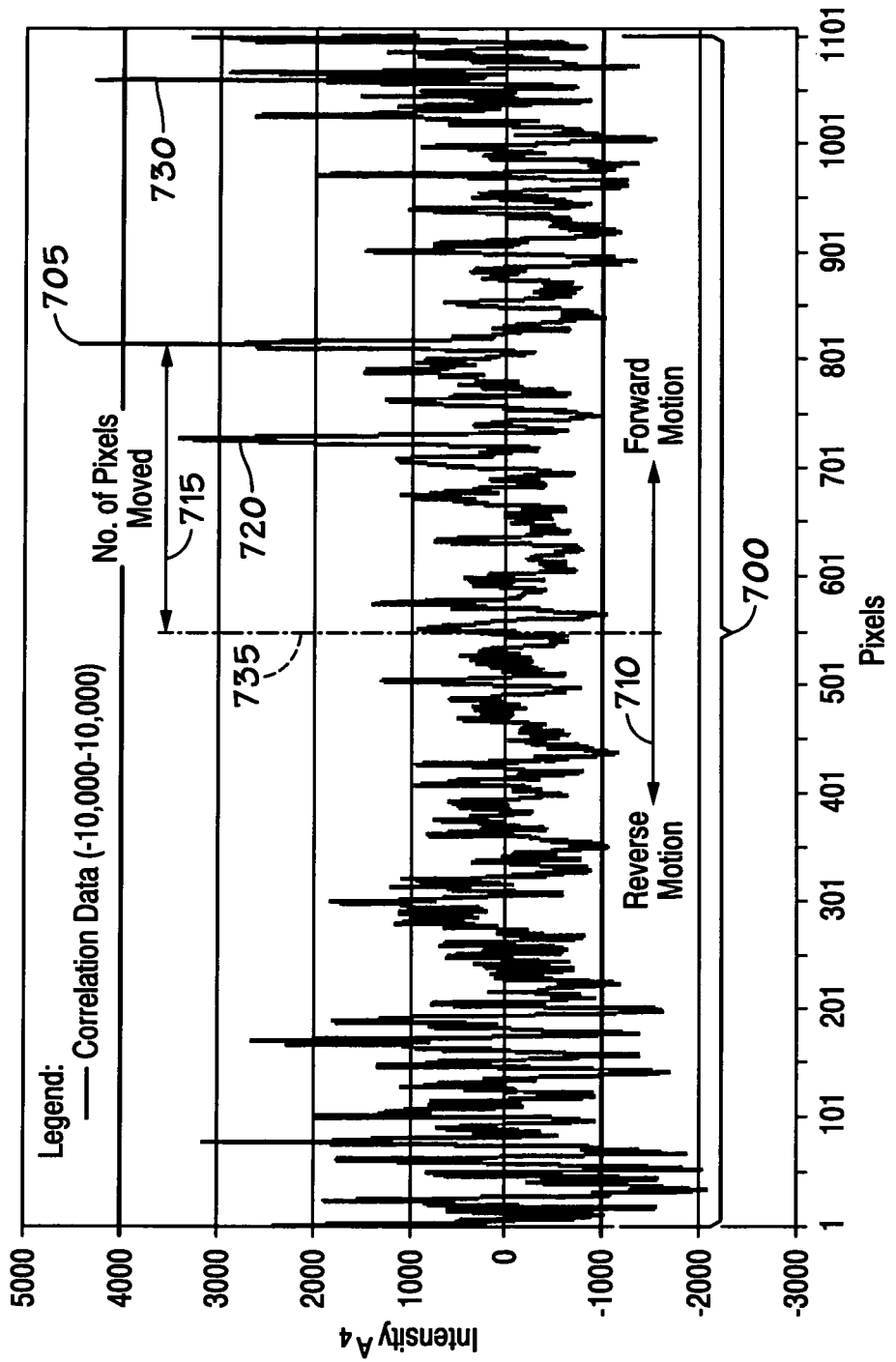
FIG. 7A is a graph showing Kurtosis cross-correlation data according to the present invention.

Referring now to FIG. 7A, the image is an example graphic representation of the resultant data from the kurtosis cross-correlation. The y or vertical axis represents the probability of a cross correlated match and the x or horizontal axis is number of pixels of image offset at each cross correlation. The data set 700 contains a maximized peak value 705. The maximized peak value 705 has a location in the array that represents the in axis pixel displacement 715 between successive captured images. This pixel displacement 715 is calculated from the center of the array 735 columns to the maximized peak 705. In this example the pixel displacement 705 is 814−501=313 pixels. The sign of the result indicates the direction of motion of the wireline cable. Any peaks to the right of the center of the array 735 have a positive sign and represent image displacements in the right-to-left direction on the image sensor, and vice-versa for peaks to the left of the center of the array 735 with a negative sign. The example shows other significant peaks 720 and 730. The correct peak 705 is selected using a smoothed second derivative peak detection algorithm.

Figure 7B:
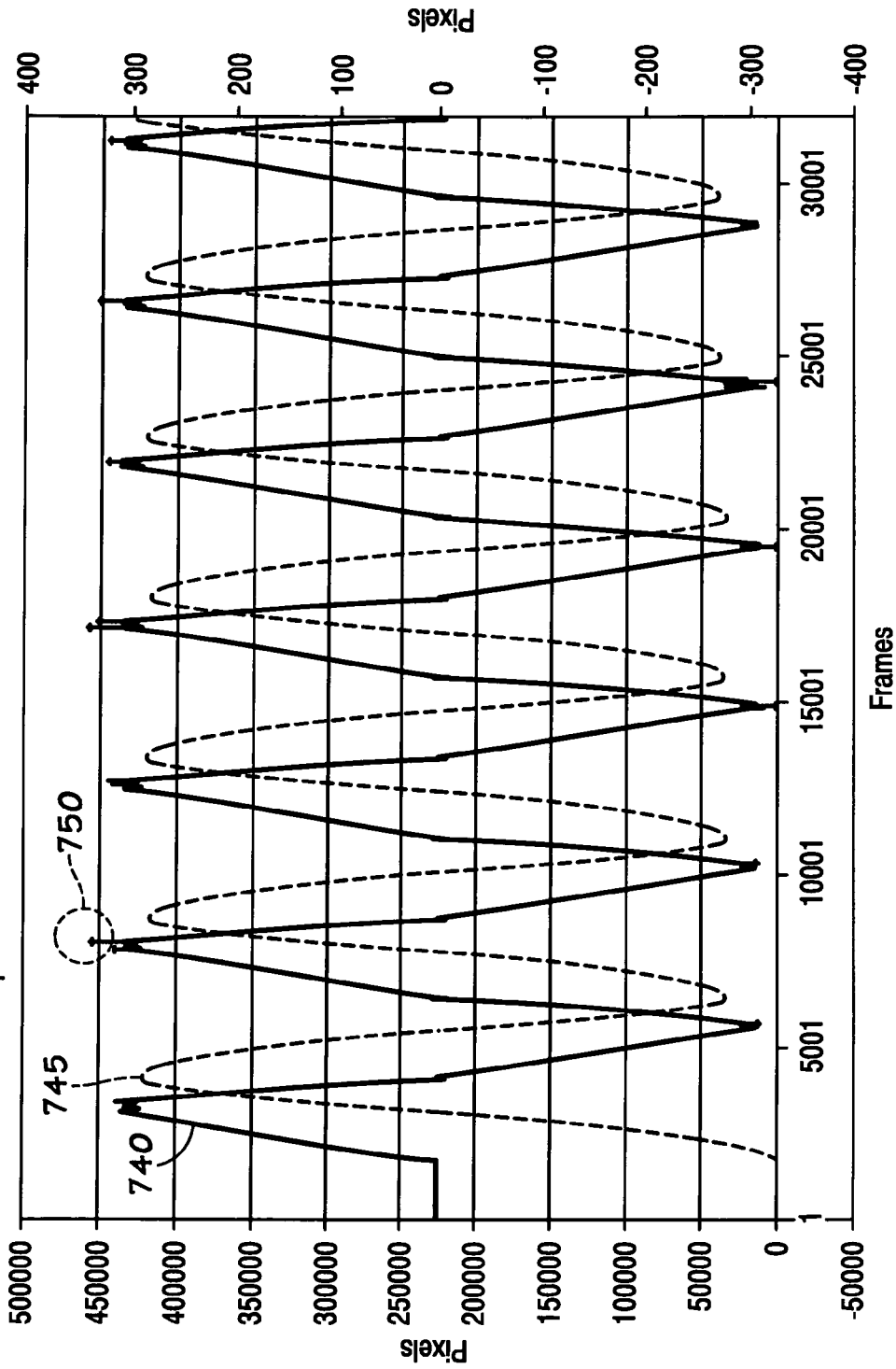
FIG. 7B is a graph showing test data from a wireline test system according to the present invention.

Referring now to FIG. 7B, an example output of data from of the preferred embodiment of the current invention. The y or vertical axis is number of pixels traversed by the wireline cable and the x or horizontal axis indicates particular individual photo frames identification number. The output data was generated as a result of a test that passed a wireline cable through the object plane of the non-contact wireline depth measurement system; to simulate the action of passing a wireline cable into a borehole and then retrieving the wireline cable from the borehole. The graph 740 depicts the pixel motion between image frames. The graph 745 depicts the cumulative total of the pixel motion between frames. The item 750 highlights a typical peak detection error that was removed from the data set per frame of a showing the result of the described firmware and algorithms demonstrates operation over several cycles and is provided here to indicate the overall operation of the system.

Referring now FIG. 8, a second gradient filter kernel is arranged to detect image artifacts perpendicular to the axis of wireline cable motion. In this arrangement, an average of the angle of the lays 800 in the image 815 of the wireline cable 150 relative to the axis of motion 805 and the width of the wireline cable 810 can be detected. Since both the width of the wireline cable 810 and the angle of the lays 800 are indicators of cable condition, it is possible, according to the present invention, to perform real-time inspection of the cable. Conditions such as failed cable strands, bird eggs, and cable wear can be detected.

Figure 9A:
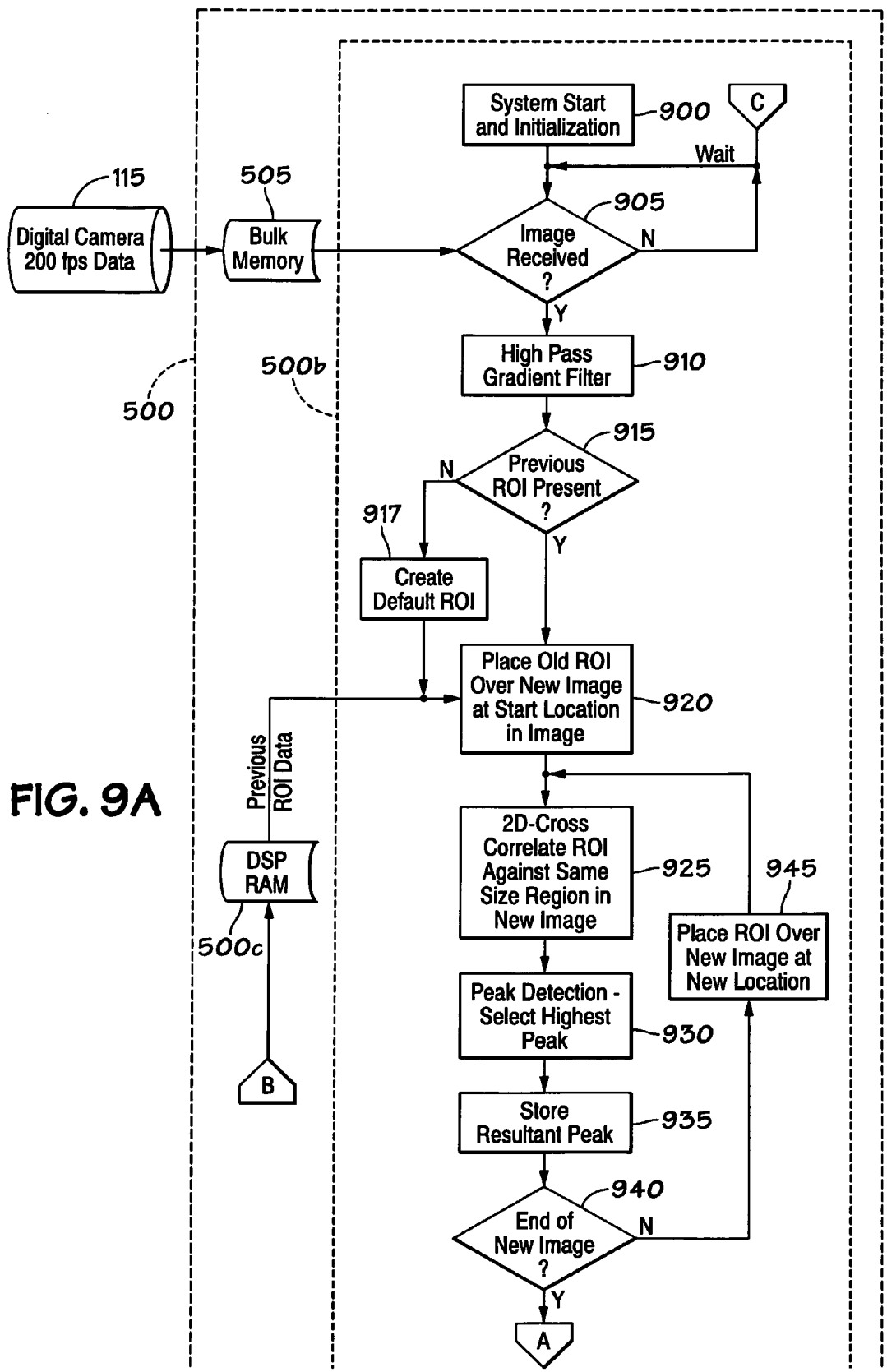
FIG. 9A presents a flow diagram illustrating operation of a two dimensional cross-correlation method according to the present invention for calculating displacement within firmware of a digital signal processor of a non-contact measurement system according to the present invention.
Figure 9B:
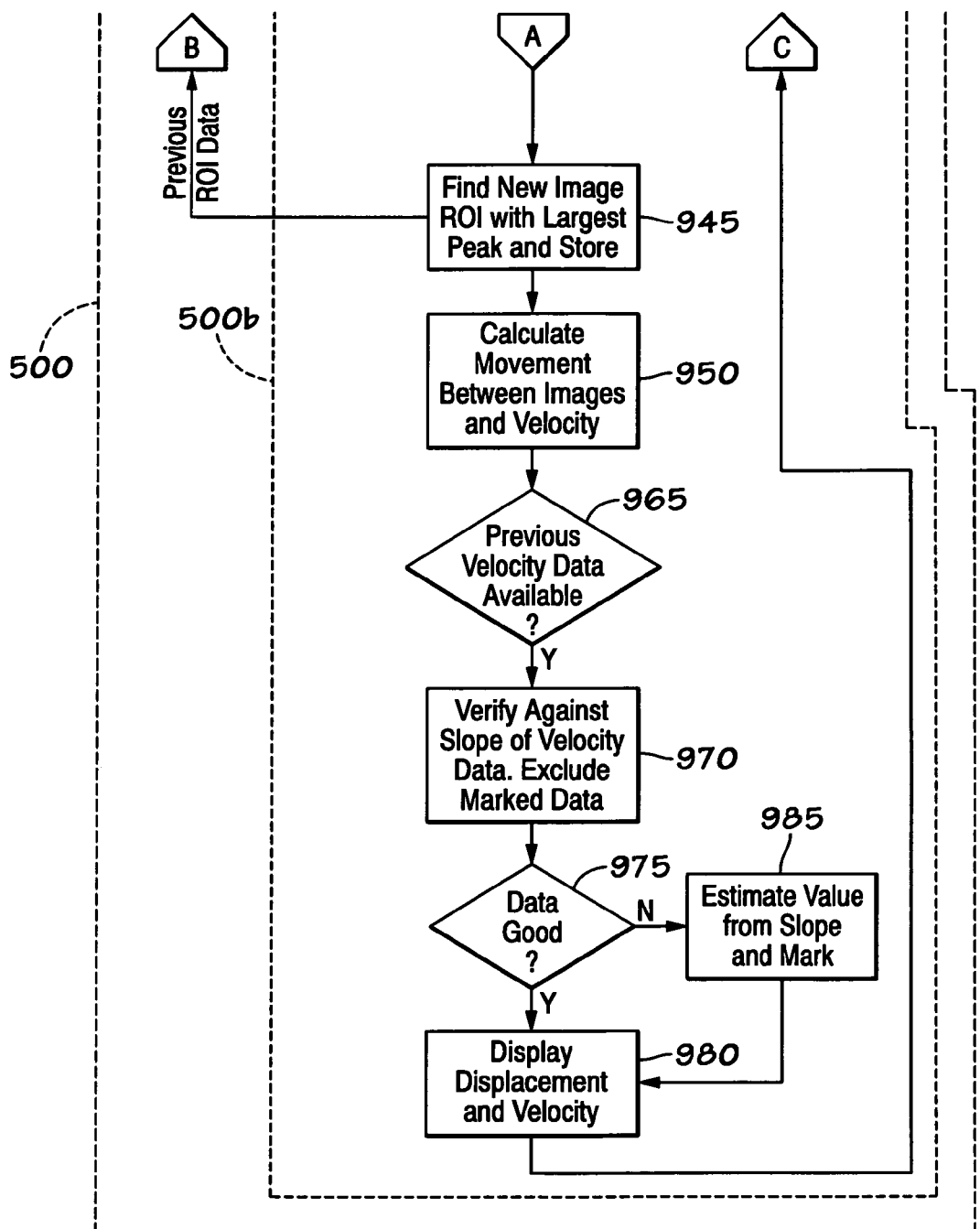
FIG. 9B presents a continuation of the flow diagram of FIG. 9A.

Referring now to FIGS. 9A and 9B, the firmware 500*b* is shown as implemented in one embodiment. The algorithm implemented is a two dimensional cross-correlation algorithm. Firmware implements a method for collecting image data from the digital camera 115 and storing it in the dual port bulk memory 505 that continues at a set rate, independent of the remainder of other actions within the firmware 500*b*. Steps 900 through 910 of this version of the algorithm are the same as those for the cross-correlation of statistical factors algorithm steps 600 through 610 and are not repeated here.

In step 915, the program checks DSP RAM 500*c* for a previous region of interest. If a previous region of interest is not found in step 917, a default region of interest is created and the program moves to step 920. If an old region of interest is not found, then the program moves directly to step 920 which is the initialization of a loop that starts at a step 925. The old region of interest is placed over the new image at zero location in the image matrix. In step 925 the program performs a two-dimensional cross-correlation between the region of interest and the region that is the same size in the new image. A peak detector is run on the resultant correlation matrix. The largest peak and its location are stored 935 in DPS RAM 500c. The end of the image is checked 935. If the region of interest is not located at the largest index in the image less an offset of the regions of interest matrix size, then the program moves the region of interest to a new location in the new image 940. The program then repeats the steps 925 through 940 until the end of the new image is reached. In one aspect, the step process defined is started at the same location in the new image that the region of interest was found in the previous image, since there is a high likelihood of the maximal peak being found at or near that location.

In step 945 the program searches through each of the peak values recorded and notes the location of the maximal peak recorded. The region in the new image that generated the highest peak is then saved to the DSP RAM 500c ready for the next image.

The remainder of the algorithm is detailed in FIGS. 6A and 6B. Certain advantages to this algorithm are a probability of accurate detection of the displacement which is very high. The algorithm is also insensitive to the effects of poorly focused or smeared images.

Figure 10A:
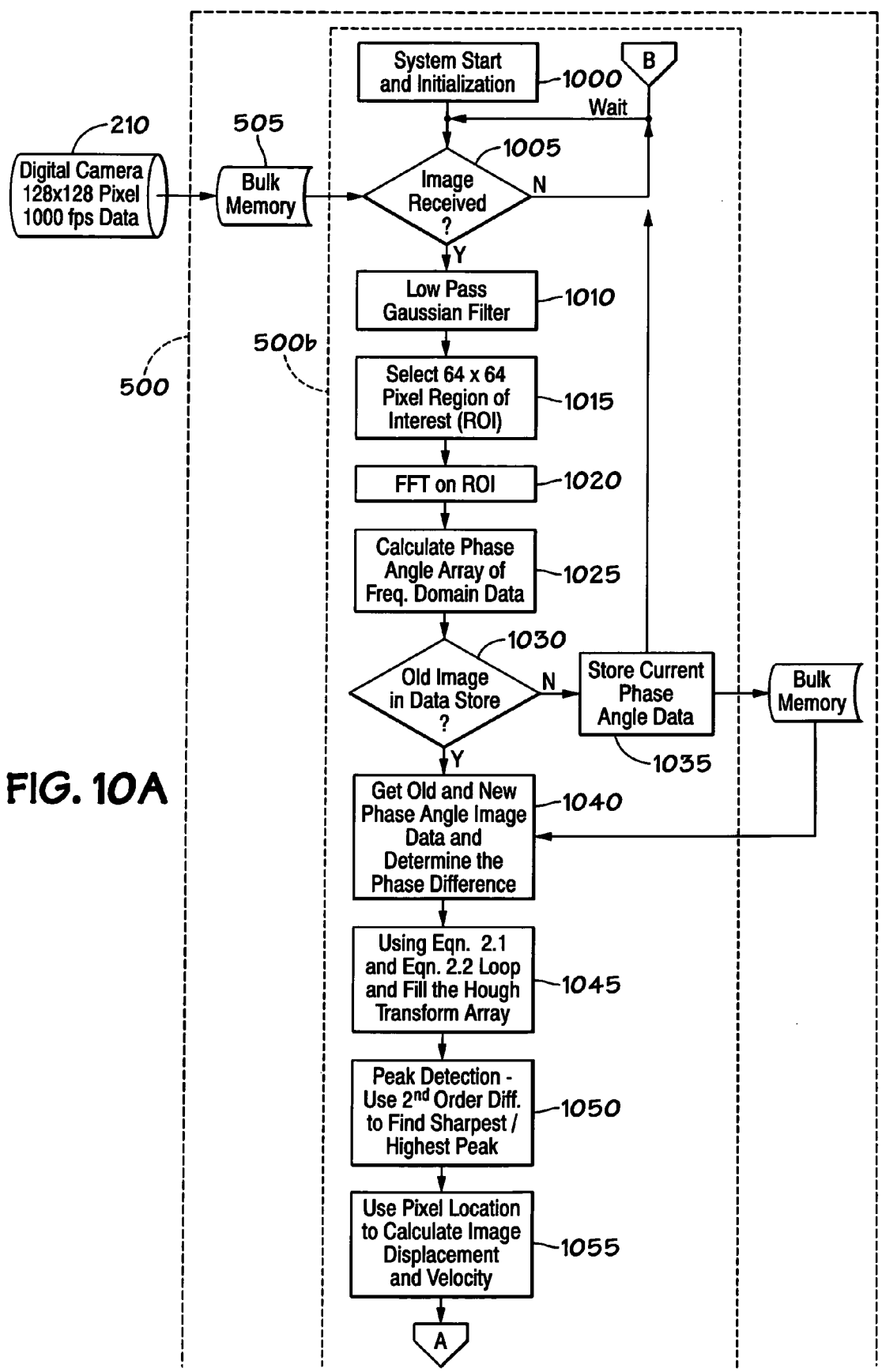
FIG. 10A presents a flow diagram illustrating operation of a Fast Fourier Transform and Hough Transform method for calculating displacement within firmware of a digital signal processor of a non-contact measurement system according to the present invention.
Figure 10B:
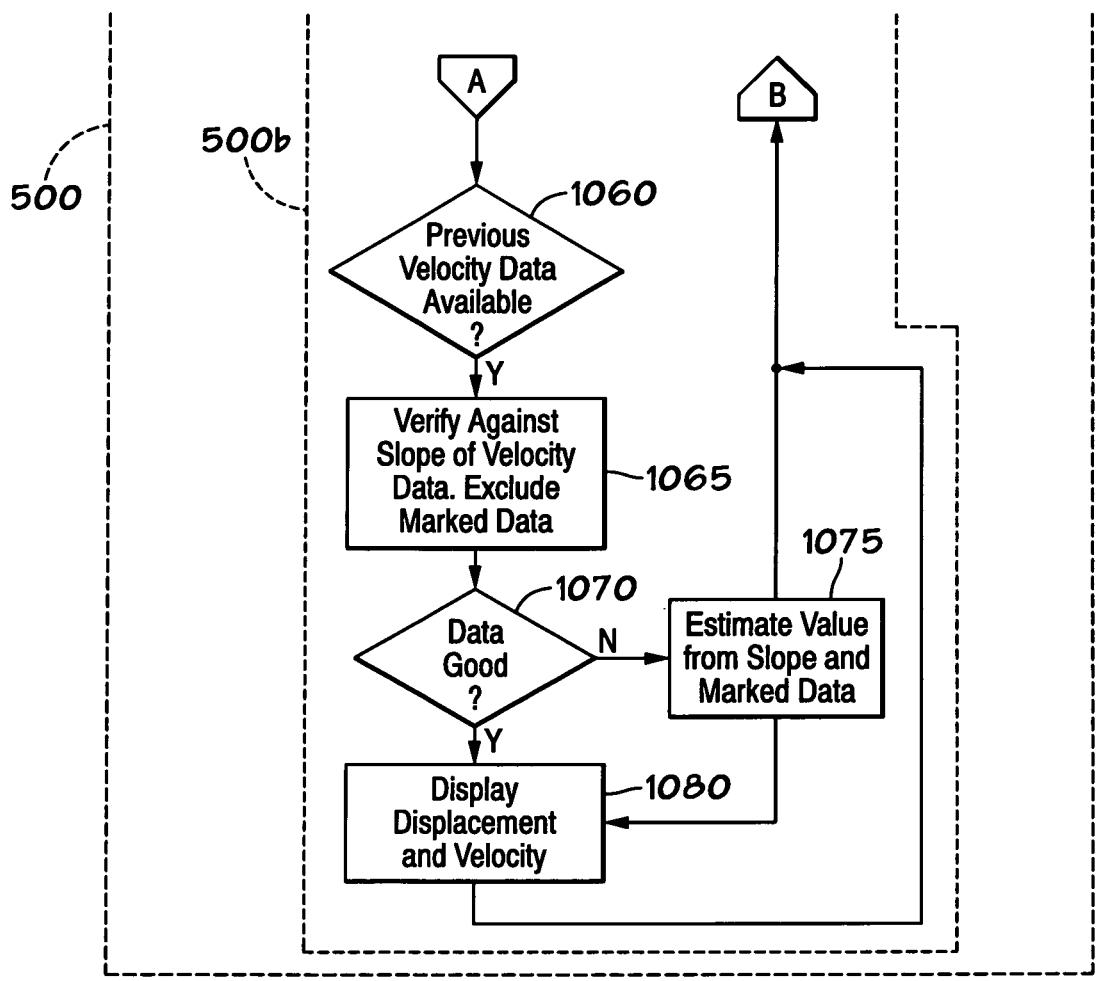
FIG. 10B presents a continuation of the diagram of FIG. 10A.

Referring now to FIGS. 10A and 10B, the firmware 500b is shown as implemented in an embodiment in which the algorithm implemented is Fast Fourier phase domain data fed into a Hough Transform. Firmware implements a method for collecting image data from the digital camera 210 and storing it in the dual port bulk memory 505 that continues at a set rate, independent of the remainder of other actions within the firmware 500b.

At the system start and initialization step 1000, the system initializes the digital camera 210 (e.g. capable of recording images at 1000 fps with a 128×128 pixel resolution) with the appropriate synthetic aperture and exposure settings along with other initialization steps required to start the system (e.g. initializing calibration factors checking bulk memory 505 and DSP RAM 500c). An image is acquired by the digital camera 210 and is passed into the bulk memory 505 in the form of an image matrix. Once an image has been acquired and received 1005 the system moves to the low pass filter step 1010. The filter implemented is a linear spatial filter.

The output of the low pass filter step 1010 is passed to step 1015 to generate a region of interest, e.g. 64×64 pixels. In step 1020, the region of interest is processed by a two dimensional Fast Fourier transform. The resultant complex matrix data is converted to phase angle magnitude data in the frequency domain 1025 using the equation:

$$\phi(\omega_x, \omega_y) = \tan^{-1} \frac{B(\omega_x, \omega_y)}{A(\omega_x, \omega_y)}$$ Eqn 1.0 where:

$B(\omega_x, \omega_y)$ is the *imagenary* part of the fourier matrix $A(\omega_x, \omega_y)$ is the real part of the fourier matrix $$\omega_x = \frac{2\pi}{N}$$ Eqn 1.1

$$\omega_y = \frac{2\pi}{M}$$ Eqn 1.2 where:
N is the num of columns in the fourier matrix
M is the num of rows in the fourier matrix
In all cases a reference to x or y is respectively a reference to the column and rows of a matrix of data.

The program checks for the last image phase angle data stored 1030. If none is found, the program stores the current phase angle data 1035 in bulk memory 505 and returns to step 1005 to collect the next image.

At step 1040, the program collects the two sets of phase angle data created from two sequential images. The real value phase angle matrix from the first image is subtracted from the phase angle matrix of the second using equation 2.0

$$\phi_{\delta t}(\omega_x, \omega_y) = \phi_t(\omega_x, \omega_y) - \phi_{t+\delta t}(\omega_x, \omega_y)$$ Eqn 2.0

This data is then passed to a Hough Transform loop 1045. Two equations are used in order to allow the Hough Transform to function for the purposes of resolving image velocity and thus displacement. The equations used are as follows:

$$v_y = \frac{1}{\omega_y \delta t}(\phi_{\delta t}(\omega_x, \omega_y) - \omega_x v_x \delta t)$$ Eqn 3.0

$$v_x = \frac{1}{\omega_x \delta t}(\phi_{\delta t}(\omega_x, \omega_y))$$ Eqn 3.1

In the current invention, the object motion in the image plane is restricted to motion in the axis of motion (e.g. longitudinal axis) of the wireline cable. A significant simplification in the loop function, in step 1045, results. A high speed camera has been selected for this implementation of the algorithm and the region of interest in the image plane is restricted to 64×64 pixels and there is no requirement to repeatedly process the image by incrementing through the image at 10 pixel increments. Also, this technique has an upper limit of about 15 pixels of resolution and the program is further restricted to a 10 pixel region. The loop also produces a Hough Transform matrix that includes results for the range ±pi.

Next the program uses a 2nd order differential peak detection algorithm 1050 to resolve the highest peak in the Hough Transform array. The location of this peak within the array provides a velocity vector for the two time separated images 1055.

The remainder of the algorithm is essentially the same as that detailed in FIGS. 6A and 6B.

Velocity is a direct result, not distance, of the use of this algorithm. There are many more data points per second than the other algorithms so small changes in velocity are apparent. The velocity can be expressed as a vector so any effects relating to motion of wireline cable perpendicular to its expected motion are known immediately.

The present invention, therefore, provides in some, but not necessarily all, embodiments, a system for measuring at least one parameter of moving cable, the system including: a digital camera for taking digital images of the cable as the cable moves, the digital camera producing signals corresponding to the digital images, a signal processor for receiving the signals from the digital camera and for processing the images to produce processed image data, the signal processor for calculating measurements of the at least one parameter of the cable based on the processed image data. Such a system may include one or some, in any possible combination, of the following: a light source for illuminating cable passing by the digital camera; electronics apparatus coupled to the signal processor for transferring the signals corresponding to the digital images from the digital camera to the signal processor; the digital camera including an image system optically coupled to the digital camera for providing images of the cable to the digital camera; a debris shield between the moving cable and the image system; a cleaning apparatus for cleaning the image system; the cleaning apparatus also for dissipating heat generated by system operation; wherein the image system includes a lens assembly; a user interface unit coupled to the signal processor; display apparatus for displaying calculated measurements; wherein the display apparatus is for displaying user input; wherein the cable (wireline or coiled tubing) is being inserted into a wellbore at an insertion area and the digital camera is located adjacent the insertion area; wherein a blowout preventer is in the insertion area and the digital camera is located above the blowout preventer; wherein a blowout preventer is in the insertion area and the digital camera is located remote from the blowout preventer; the signal processor includes memory for storing multiple successive images of the cable; wherein the signal processor processes two successive images to produce a result proportional to the displacement related to the two successive images; wherein the signal processor calculates velocity of the moving cable based on the displacement of the two successive images and time elapsed between them; the signal processor is a computer or at least one computer; the signal processor calculates the displacement between successive images using an algorithm comprising one of a cross-correlation of statistical factors algorithm, a two-dimensional cross-correlation algorithm, and a two-dimensional Fast Fourier transform algorithm used with a Hough transform loop; a system power source, the system power source for powering system component(s), e.g., at least one of the digital camera and the signal processor; wherein the digital camera is adjacent the moving cable; and/or wherein the cable is coiled tubing; wherein the cable is wireline.

The present invention provides a system for measuring at least one parameter of moving cable, the system including: a system power source, a digital camera for taking digital images of the cable as the cable moves, the digital camera producing signals corresponding to the digital images, a signal processor for receiving the signals from the digital camera and for processing the images to produce processed image data, the signal processor including memory for storing multiple successive images of the cable, the signal processor for calculating measurements of the at least one parameter of the cable based on the processed image data, a light source for illuminating the moving cable, electronics apparatus coupled to the signal processor for transferring the signals corresponding to the digital images from the digital camera to the signal processor, the digital camera including an image system optically coupled to the digital camera for providing images of the cable to the digital camera, the image system including a lens assembly, a cleaning apparatus for cleaning the image system, a user interface unit coupled to the signal processor, display apparatus for displaying calculated measurements, and wherein the signal processor for processing two successive images to produce a result proportional to the displacement related to the two successive images. In such a system the signal processor may calculate the displacement between successive images using an algorithm comprising one of a cross-correlation of statistical factors algorithm, a two-dimensional cross-correlation algorithm, and a two-dimensional Fast Fourier transform algorithm used with a Hough transform loop.

The present invention discloses computer readable media containing instructions that, when executed, cause a processor to perform any of the methods or method step or steps disclosed herein. In certain aspect, the present invention provides a computer readable media containing instructions that, when executed, cause a processor to control operation of a system for measuring at least one parameter of moving cable and that, when executed, cause the processor to calculate measurements of at least one parameter of the moving cable, the system including: a digital camera apart from or adjacent a moving cable for taking digital images of the cable as the cable moves, the digital camera producing signals corresponding to the digital images, a signal processor for receiving the signals from the digital camera and for processing the images to produce processed image data, and the signal processor for calculating measurements of the at least one parameter of the cable based on the processed image data. Such a computer readable media may include further instructions, that, when executed, cause the processor to process two temporally successive images of moving cable to determine displacement between the two images; and/or the computer readable media's instructions may use an algorithm which is one of a cross-correlation of statistical factors algorithm, a two-dimensional cross-correlation algorithm, and a two-dimensional Fast Fourier transform algorithm used with a Hough transform loop.

The present invention provides methods for determining at least one parameter of moving cable, the methods including: with a digital camera taking digital images of a cable moving adjacent the digital camera, the digital camera part of a system for measuring at least one parameter of the moving cable, the system as any disclosed herein according to the present invention; producing signals with the digital camera corresponding to the digital images; transmitting the signals to the signal processor; producing with the signal processor processed image data; and based on the processed image data with the signal processor calculating a value for the at least one parameter. Such a method may include one or some of the following, in any possible combination: calculating with the signal processor displacement between two successive images; calculating with the signal processor the velocity of the moving cable in moving between two successive images; positioning the digital camera is adjacent the moving cable; providing images to the digital camera with an image system; cleaning the image system with cleaning apparatus; dissipating heat generated by system operation with the cleaning apparatus; displaying calculated measurements; and/or wherein the cable is one of wireline and coiled tubing.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes. It is the express intention of the applicant not to invoke 35 U.S.C. §112, paragraph 6 for any limitations of any of the claims herein, except for those in which the claim expressly uses the words 'means for' together with an associated function. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

What is claimed is:

1. A system for measuring at least one parameter of moving cable, the system comprising
    a digital camera for taking digital images of the cable as the cable moves, the digital camera further producing signals corresponding to the digital images, wherein the cable is being inserted into a wellbore at an insertion area and the digital camera is located in a fixed position while taking the digital images, and
    a signal processor for receiving the signals from the digital camera and for processing the images to produce processed image data, the signal processor for calculating measurements of at least one of a displacement, a velocity, and an acceleration of the moving cable based on the processed image data.

2. The system of claim 1 further comprising a light source for illuminating cable passing by the digital camera.

3. The system of claim 1 further comprising electronics apparatus coupled to the signal processor for transferring the signals corresponding to the digital images from the digital camera to the signal processor.

4. The system of claim 1, wherein the digital camera includes an image system that is optically coupled to the digital camera for providing images of the cable to the digital camera.

5. The system of claim 4 further comprising a debris shield between the moving cable and the image system.

6. The system of claim 4 further comprising a cleaning apparatus for cleaning the image system.

7. The system of claim 6, wherein the cleaning apparatus dissipates heat generated by system operation.

8. The system of claim 4 wherein the image system includes a lens assembly.

9. The system of claim 1 further comprising a user interface unit coupled to the signal processor.

10. The system of claim 1 further comprising display apparatus for displaying calculated measurements.

11. The system of claim 8 wherein the display apparatus is for displaying user input.

12. The system of claim 1 wherein the digital camera is located adjacent the insertion area.

13. The system of claim 1, wherein a blowout preventer is in the insertion area and the digital camera is located above the blowout preventer.

14. The system of claim 1, wherein a blowout preventer is in the insertion area and the digital camera is located remote from the blowout preventer.

15. The system of claim 1 wherein the signal processor includes memory for storing multiple successive images of the cable.

16. The system of claim 15 wherein the signal processor processes two successive images to produce a result proportional to the displacement related to the two successive images.

17. The system of claim 15 wherein the signal processor calculates velocity of the moving cable based on the displacement of the two successive images and time elapsed between them.

18. The system of claim 1 wherein the signal processor is a computer.

19. The system of claim 16 wherein the signal processor calculates the displacement between successive images using an algorithm comprising one of a cross-correlation of statistical factors algorithm, a two-dimensional cross-correlation algorithm, and a two-dimensional Fast Fourier transform algorithm used with a Hough transform loop.

20. The system of claim 16 further comprising a system power source, the system power source for powering at least one of the digital camera and the signal processor.

21. The system of claim 16 wherein the digital camera is positioned adjacent to the moving cable.

22. The system of claim 1 wherein the cable is coiled tubing.

23. The system of claim 1 wherein the cable is wireline.

24. A system for measuring at least one parameter of moving cable, the system comprising
    a system power source,
    a digital camera for taking digital images of the cable as the cable moves, the digital camera further producing signals corresponding to the digital images, wherein the cable is being inserted into a wellbore at an insertion area and the digital camera is located in a fixed position while taking the digital images,
    a signal processor for receiving the signals from the digital camera and for processing the images to produce processed image data, the signal processor including memory for storing multiple successive images of the cable, the signal processor for calculating measurements of the at least one parameter of the cable based on the processed image data,
    a light source for illuminating the moving cable,
    electronics apparatus coupled to the signal processor for transferring the signals corresponding to the digital images from the digital camera to the signal processor,
    the digital camera including an image system optically coupled to the digital camera for providing images of the cable to the digital camera, the image system including a lens assembly,
    a cleaning apparatus for cleaning the image system,
    a user interface unit coupled to the signal processor,
    display apparatus for displaying calculated measurements, and
    wherein the signal processor is adapted for processing two successive images to produce a result proportional to the displacement related to the two successive images.

25. The system of claim 24 wherein the signal processor calculates the displacement between successive images using an algorithm comprising one of a cross-correlation of statistical factors algorithm, a two-dimensional cross-correlation algorithm, and a two-dimensional Fast Fourier transform algorithm used with a Hough transform loop.

26. A non-transitory computer readable media containing instructions that, when executed, cause a processor to control operation of a system for measuring at least one parameter of moving cable and that, when executed, cause the processor to calculate measurements of at least one parameter of the moving cable, the system comprising a system power source, a digital camera for taking digital images of the cable as the cable moves past the digital camera, the digital camera further producing signals corresponding to the digital images, wherein the cable is being inserted into a wellbore at an insertion area and the digital camera is located in a fixed position while taking the digital images, a signal processor for receiving the signals from the digital camera and for processing the images to produce processed image data, and the signal processor for calculating measurements of at least one of a displacement, a velocity, and an acceleration of the moving cable based on the processed image data.

27. The computer readable media of claim 26 further comprising instructions, that, when executed, cause the processor to process two temporally successive images of moving cable to determine displacement between the two images.

28. The computer readable media of claim 26, wherein the computer readable media's instructions use an algorithm which is one of a cross-correlation of statistical factors algorithm, a two-dimensional cross-correlation algorithm, and a two-dimensional Fast Fourier transform algorithm used with a Hough transform loop.

29. A method for determining at least one parameter of moving cable, the method comprising inserting a cable into a wellbore at an insertion area fixedly positioning a digital camera proximate said cable, moving said cable relative to said fixedly positioned digital camera, as the cable moves past the digital camera, taking digital images of the moving cable with the digital camera, the digital camera comprising a system for measuring at least one parameter of the moving cable, the system further comprising a system power source and a signal processor, producing signals with the digital camera corresponding to the digital images, transmitting the signals to the signal processor, producing with the signal processor processed image data, and based on the processed image data, calculating with the signal processor calculating a value for at least one of a displacement, a velocity, and an acceleration of the moving cable.

30. The method of claim 29 further comprising producing, with the digital camera, signals associated with two temporally successive images and calculating with the signal processor the displacement of the moving cable between the two successive images.

31. The method of claim 30 further comprising calculating with the signal processor said velocity of the moving cable in moving between the two successive images.

32. The method of claim 30 wherein the signal processor calculates the displacement between successive images using an algorithm, the algorithm comprising one of a cross-correlation of statistical factors algorithm, a two-dimensional cross-correlation algorithm, and a two-dimensional Fast Fourier transform algorithm used with a Hough transform loop.

33. The method of claim 29, further comprising powering at least one of the digital camera and the signal processor with the system power source.

34. The method of claim 29, wherein the digital camera is positioned adjacent to the moving cable.

35. The method of claim 29, wherein the system includes an image system optically coupled to the digital camera, the image system being positioned adjacent to the moving cable.

36. The method of claim 35, further comprising providing images of the cable to the digital camera with the image system.

37. The method of claim 29, wherein the system includes a cleaning apparatus for cleaning the image system, the method further comprising cleaning the image system.

38. The method of claim 29, further comprising dissipating heat generated by system operation.

39. The method of claim 29, wherein the system further comprises a user interface unit coupled to the signal processor, and display apparatus for displaying calculated measurements, the method further comprising displaying calculated measurements.

40. The method of claim 29 wherein the cable is one of wireline and coiled tubing.

* * * * *